Dec. 23, 1952          W. A. RAY          2,622,408
EXPANSION VALVE
Filed Jan. 10, 1947
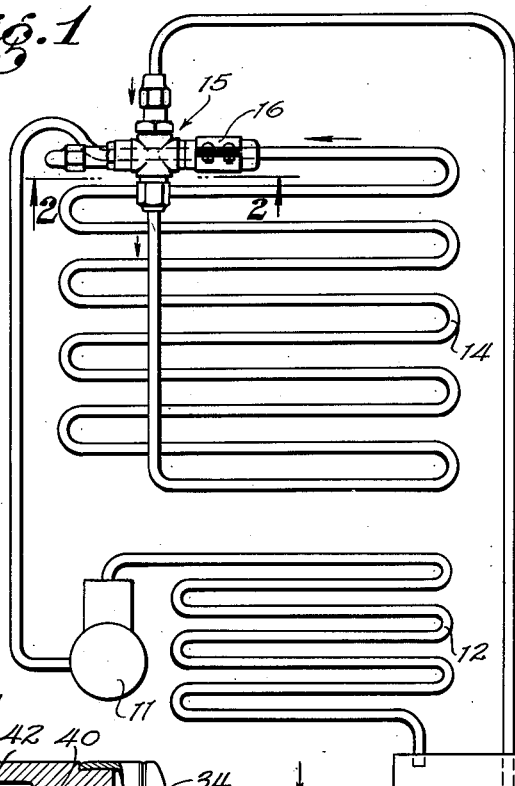
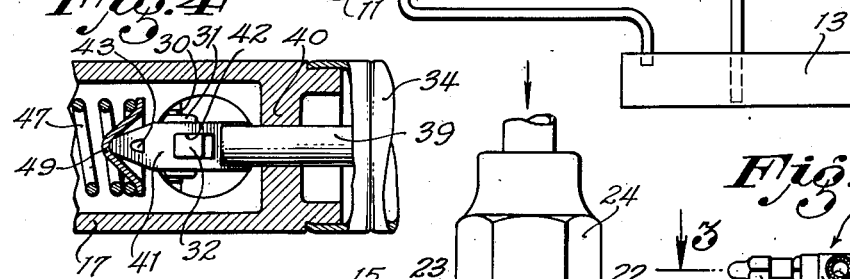
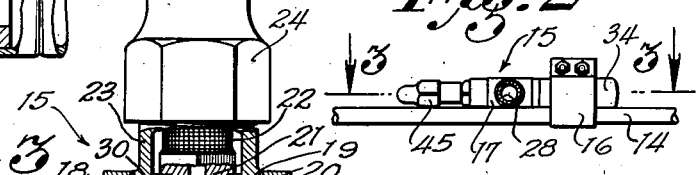
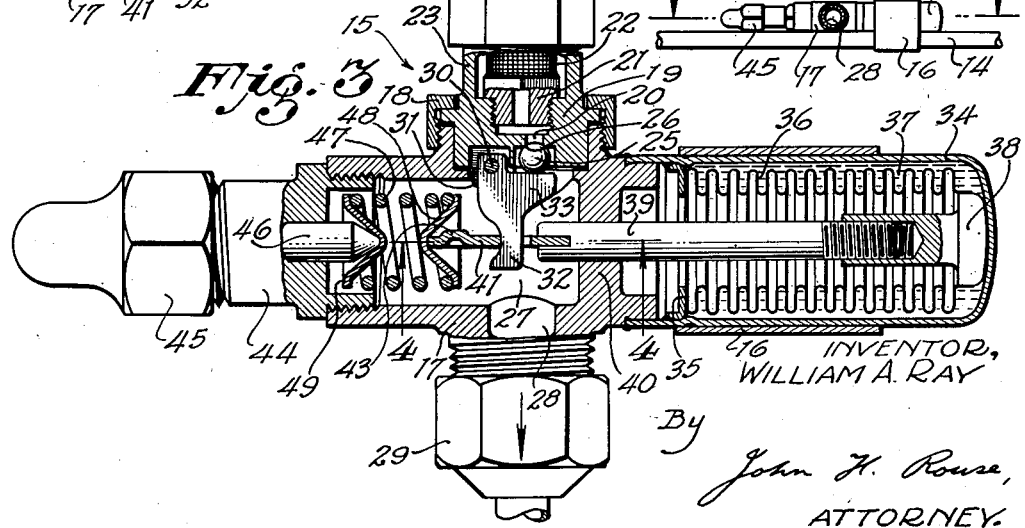
INVENTOR,
WILLIAM A. RAY
By John H. Rouse,
ATTORNEY.

Patented Dec. 23, 1952

2,622,408

UNITED STATES PATENT OFFICE 2,622,408

EXPANSION VALVE

William A. Ray, North Hollywood, Calif., assignor to General Controls Co., Glendale, Calif., a corporation of California Application January 10, 1947, Serial No. 721,233

1 Claim. (Cl. 62—8)

This invention relates to thermostatic expansion-valves for mechanical refrigerating systems In conventional valves of this type the thermostatic operating means usually consists of a fluid-pressure motor having a remote thermal-bulb for mounting at the outlet of the evaporator and connected to the motor by a capillary tube. It is an object of this invention to provide a thermostatic expansion-valve wherein the thermally-static responsive member forms a unitary and rigid part of the valve, thereby reducing manufacturing costs and avoiding the possibility of damage and leakage inherent in a valve having a flexibly-mounted thermal-bulb.

Another object of the invention is to so arrange the thermally-responsive member with respect to the valve that there is limited thermal transfer between the member and the refrigerant flowing through the valve, so that an "anticipating" effect is produced whereby flow through the valve is relatively constant (but at rates varying according to the demand), as distinguished from the periodically-interrupted flow which occurs in a conventional valve unless the same is of the more-complicated type having an external equalizer and wherein the motor-diaphragm is isolated from the pressure of the refrigerant and connected to the valve means by packed push-pins or the like.

It is another object to provide a thermostatic expansion-valve which includes a novel form of leverage connection between the motor and the valve means.

For full understanding of the invention, and further appreciation of its objects and advantages, reference is to be had to the following detailed description and accompanying drawing, and to the appended claim.

In the drawing:

Figure 1 is a schematic view of a refrigerating system which includes a thermostatic expansion-valve embodying this invention;

Figure 2 is a fragmentary sectional view taken along the line 2—2 of Fig. 1;

Figure 3 is an enlarged longitudinal sectional view of the valve shown in Figs. 1 and 2; and Figure 4 is a fragmentary section taken along the line 4—4 of Fig. 3.

Referring first to Fig. 1 of the drawing, the refrigerating system shown is of conventional mechanical type and includes the usual arrangement of compressor 11, condenser 12, receiver 13, and evaporator 14. Inserted ahead of the evaporator is a valve 15, according to this invention, which hereinafter will be described in detail; it sufficing now to point out that (as also shown in Fig. 2) an end portion or extension of the valve is secured in contact with the evaporator at its outlet end by means of a strap 16.

Referring now more particularly to Figs. 3 and 4, the numeral 17 indicates a generally cross-shaped valve casing having at its top an inlet opening wherein is secured, by a sleeve-nut 18, a port member 19 having an inlet passage or port 20. Supported by a hollow screw 21, threaded in an outer opening in the port member communicating with the port 20, is a strainer 22 surrounded by a tubular extension 23 of the port member, which extension is provided with a compression fitting 24. Within a shallow recess in the inner surface of the port member 19 is a spherical closure 25 which cooperates with a seat 26 at the inner end of port 20. The port member constitutes a partition separating the inlet of the valve from its outlet chamber 27 and outlet passage 28; connection to which passage is afforded by another compression fitting 29. Pivoted on a pin 30 and guided between ears 31 projecting from the port member is a lever having a main arm 32 extending directly away from the port member, and a branch arm 33 which constitutes a cam cooperable with the closure 25.

Extending from the right-hand cross-portion of the valve casing and sealingly secured (as by solder) thereto is a thermal fluid-pressure motor comprising a cup-shaped housing 34, preferably of copper, within which, and sealingly joined thereto at its inner end by a washer 35, is an expansible-contractible metallic bellows 36; the space between the housing and the bellows being charged or filled with thermally-expansible fluid indicated at 37. The outer end of the bellows is sealed by a head 38 having an inner hollow projection threaded to receive a stem 39 which is guided at its inner end in a conforming opening through the casing-wall 40 of the outlet chamber 27. Secured to the inner end of the stem is a blade 41 which is apertured (as indicated at 42 in Fig. 4) to receive the end portion of lever-arm 32 and formed near its nose or extremity to provide a stiffening boss 43. Threaded in a fitting 44, closing the hollow left-hand cross-portion of the valve casing and sealed at its outer end by a cap-nut 45, is a rod 46 which serves as an adjustable abutment for one end of a spring 47 whose other end bears on the blade 41 through a cup 48 shaped to receive the rounded nose of the blade; another cup 49 connecting the spring to the conical tip of rod 46.

When the valve is connected in a refrigerating system with its thermal motor strapped to the pipe which forms the outlet of the evaporator, as shown in Figs. 1 and 2, with increase of superheat the bellows is contracted under the pressure of the thermally-expanding fluid in the motor, moving the stem 39 and blade 41 inwardly against the force of spring 47 so that the lever 32—33 can rock in a clockwise direction to permit opening or wider-opening of the ball valve under the pressure of the refrigerant.

As the refrigerant passes into the outlet chamber and there expands, due to the low temperature of the refrigerant acting on the thermal motor through the casing-wall 40 the bellows expands, forcing the ball 25 closer to its seat so that the effect of the superheat is partially offset.

In this way an "anticipating" effect is produced which minimizes "over-shooting" so that normally the flow of refrigerant through the valve is substantially constant but throttled according to demand; the leverage advantage of lever 32—33 contributing to this effect. The casing-wall 40 serves as a barrier (requiring, however, no seal or packing around the stem) which limits thermal transfer between the motor and the expanded refrigerant in the outlet chamber; and by suitably arranging or proportioning this barrier the proper degree of anticipating effect can be achieved for various operating conditions.

The specific embodiment of my invention herein shown and described is obviously susceptible of modification without departing from the spirit of the invention, and I intend therefore to be limited only by the scope of the appended claim.

I claim as my invention:

In a refrigerating system including an evaporator; a thermostatic expansion-valve comprising a metallic casing having aligned inlet and outlet passages and an outlet-chamber therebetween, valve means for controlling flow of refrigerant through the casing to said evaporator, a thermal motor, mounted on the wall of the casing which defines said outlet-chamber, comprising an expansible-contractible bellows and encompassing cup-shaped metallic member joined to the bellows to form a pressure chamber containing thermally-expansible fluid, said cup-shaped member being joined directly to said casing-wall so that it protrudes therefrom in a direction generally at right-angles to the axis of said passages, and a stem connected to said bellows and extending through a conforming opening in said casing-wall for operating said valve means, said metallic casing-wall serving to permit limited thermal transfer between the thermal motor and the refrigerant in said outlet-chamber so that the operation of the motor is influenced by the temperature of the refrigerant passing to the evaporator; and means for mounting the valve in the system with said cup-shaped member in thermal contact with a portion of said evaporator adjacent its outlet end.

WILLIAM A. RAY.

REFERENCES CITED

The following references are of record in the file of this patent:

UNITED STATES PATENTS

| Number | Name | Date |
| --- | --- | --- |
| 1,969,652 | Larkin | Aug. 7, 1934 |
| 1,974,631 | Slagel | Sept. 25, 1934 |
| 1,994,698 | Evers | Mar. 19, 1935 |
| 2,094,875 | DeLuiz | Oct. 5, 1937 |
| 2,240,374 | Newton | Apr. 29, 1941 |
| 2,277,998 | Thompson | Mar. 31, 1942 |